3,478,793
Patented Nov. 18, 1969

3,478,793
FEEDING MECHANISM
Walter J. Reinecker, 1231 Martine Ave., Plainfield, N.J.
07060, and David J. Westergard, 1000 Primrose Road,
Annapolis, Md. 21403
Filed Nov. 3, 1967, Ser. No. 680,512
Int. Cl. A01f *29/00, 17/02*
U.S. Cl. 146—70.1                                 10 Claims

ABSTRACT OF THE DISCLOSURE

This invention relates to equipment for dispensing or dispersing material; and more particularly to equipment for controlling the flow rate or feed rate of material into dispensing means such as a blower or the like. The means for controlling the flow rate consists of an independently driven shaft having a bent end portion to tear apart mulch material prior to being dispensed.

---

The prior art includes a number of machines for dispensing and dispersing materials over the ground. As a general rule these machines are of the blower type that operate at a relatively constant speed and blow material through a spout over the ground. Common use of these machines is for the spreading of sprigs, stolons and other similar live plant materials and for the distribution of mulch materials of which straw, hay, alfalfa and sugar cane are some of the better known mulch materials. These materials are commonly obtained in a baled or compacted state. The baled or compacted materials are fed into the machines by hand where various types of devices, such beaters or flailing chains, are used to loosen and break up the baled material so that it can be efficiently dispensed by the machines.

The purpose of the machines is to cover large areas of ground with various kinds of materials. The uniformity as well as the density of the coverage can be controlled in one of two ways; either by controlling the flow rate of material through the machine, or by repeated applications of material. It is obvious that repeated applications of material is an inefficient utilization of both the machine and its operator or operators because the same result can be obtained by controlling the flow rate of material through the machine.

As mentioned, the prior art machines are operated generally at a constant speed and are hand fed. The only way to increase the flow rate of material into the machine is for the operator to force more material into the machine. Since the operator does not have time to break or loosen the baled material, clogging of the machine occurs and is a common problem. In addition, uniform coverage of ground by hand fed machines depends upon the operators ability to feed the machine at a uniform rate.

The invention is embodied within a device that is capable of controlling the flow rate of mulch material into the machine. In addition to controlling the flow rate, it also initially loosens and breaks up baled or compacted material to discourage clogging of the machine. The device is controlled independently from the dispensing machine and therefore can be used to control the flow rate of material through the machine without interferring with or changing the normal operation of the machine.

The device embodying the invention comprises a pointed rotating shaft that is mounted upon a dispensing machine so that the point of the shaft impales the mulch material as it is introduced into the machine. The shaft is bent or longitudinally irregular so that it describes or generates a cylinder when rotated, the base of the cylinder being generated by the shaft point. The flow rate of the material into the machine is controlled by the rotational speed of the shaft; the faster the shaft is rotated, the greater is the resulting flow rate.

The invention will be better understood, its features and advantages more readily apparent upon a study of the following detailed description of an illustrative embodiment of the invention when read in conjunction with the drawing, in which.

Figure 1:
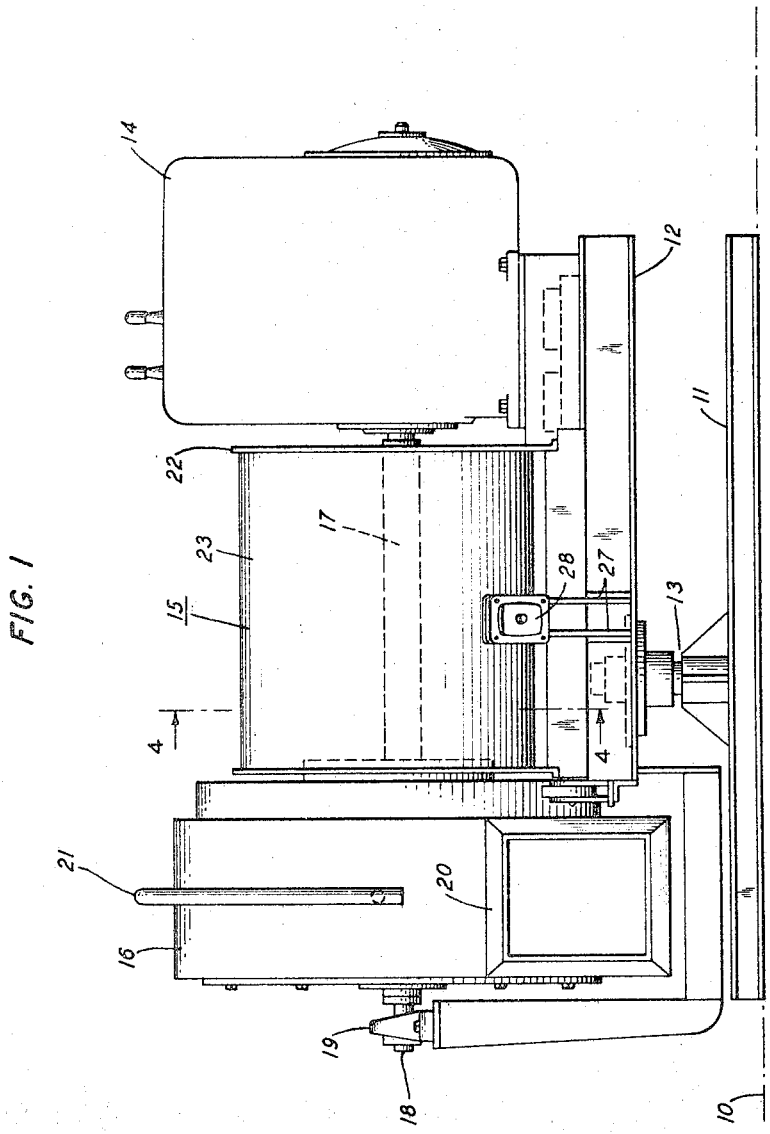
FIG. 1 is a side view of a machine embodying the invention.
Figure 2:
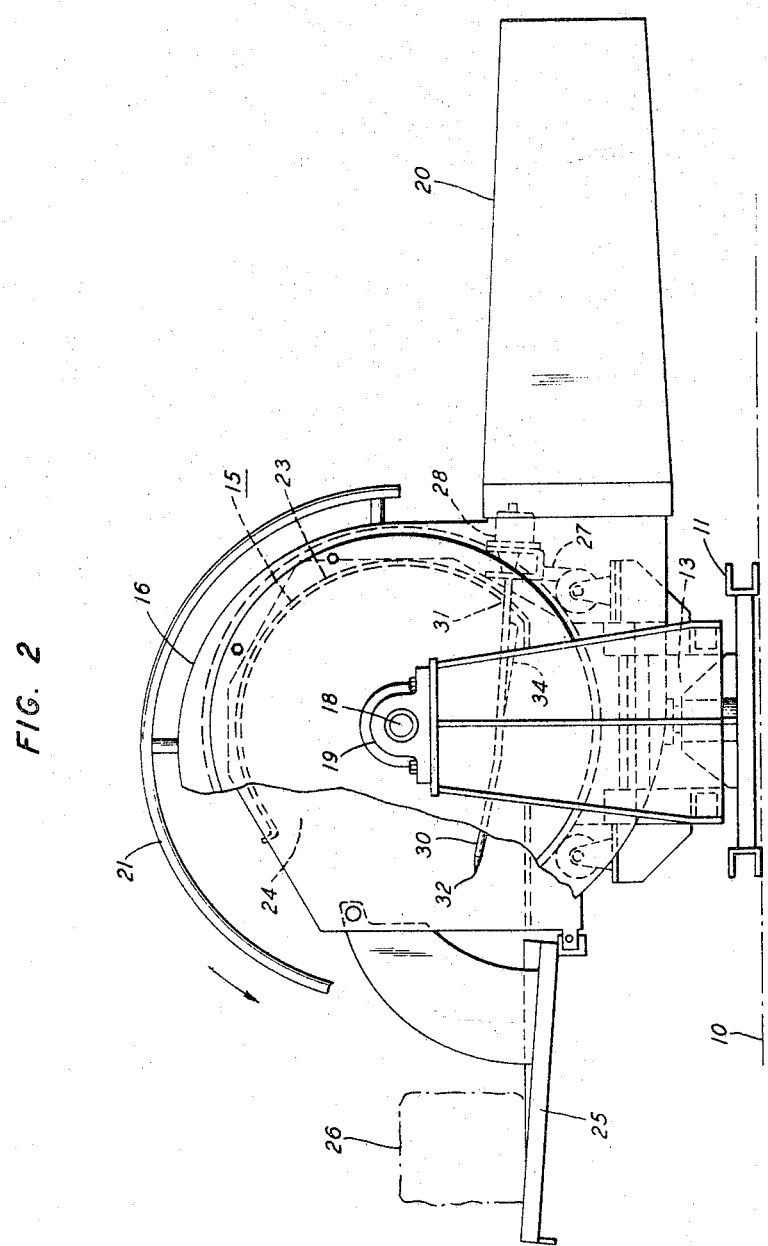
FIG. 2 is a partially sectioned end view of the machine shown in FIG. 1.
Figure 3:
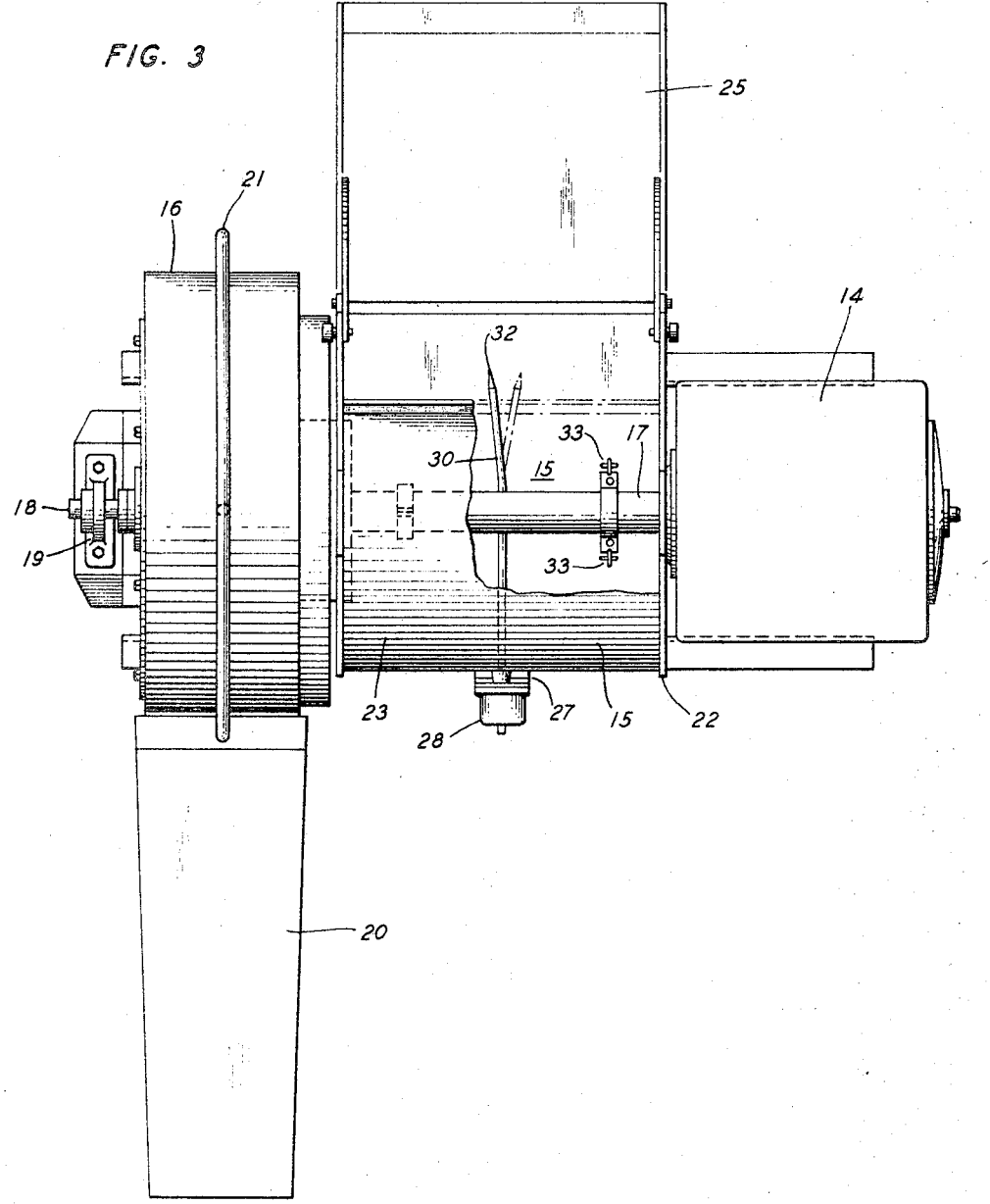
FIG. 3 is a top view of the machine shown in FIG. 1.

FIG. 1 shows a machine for spreading, diffusing or distributing materials over the ground. The normal spreading materials are mulch, seed, sprigs, stolons, hay, fertilizer, lime or other similar materials. Some of the above mentioned materials are obtained in bale form; mulching materials especially, and it is toward baled or compacted materials that the invention finds its most advantageous and efficient use.

The spreading machine shown in the various figures is adapted to be mounted upon a truck bed 10 or any other suitable mounting platform. A truck bed 10 is preferable because of its mobility. However, stationary platforms are also usable depending upon the use of the machine.

The machine comprises a basic frame 11 upon which other components are mounted. A secondary frame 12 is rotatably attached to the basic frame 11 by means of an axle or journal 13. The secondary frame 12 rotates with respect to the basic frame 11 in a generally horizontal plane parallel with the upper surface of the truck bed 10 or supporting platform.

An engine 14, mixing chamber 15, and fan housing 16 are mounted upon the secondary frame 12. The output or drive shaft 17 of the engine 14 extends through the chamber 15 and housing 16. The end 18 of the shaft 17 distant from the engine 14 is supported upon a portion of the frame 12 by means of a bearing 19. A fan (not shown) is mounted upon the shaft 17 inside the housing 16 and a spout or chute 20 is mounted upon the periphery of the housing 16.

The fan housing 16 is rotatable with respect to the chamber 15 in a plane perpendicular to the plane of rotation of the secondary frame 12 with respect to the basic frame 11. A handle 21 that is attached to the circumference of the housing 16 is used to rotate the housing 16 in one plane and the frame 12 in the second plane. Thus, the spout 20 is turret mounted and can be aimed in any direction by a combination of the two above-described rotations.

The chamber 15 is essentially drum shaped being closed by a plate 22 on the engine end. The shaft 17 extends through the plate 22 and through the chamber 15. The opposite end of the chamber 15 opens into the housing 16. The fan, among other things, generates a flow of air that is projected out of the spout 20. Material inserted into the chamber 15 passes from the chamber 15 into the housing 16 and then through the spout 20. The aim of the spout 20 determines the direction of the diffusion and distribution of the material.

Figure 4:
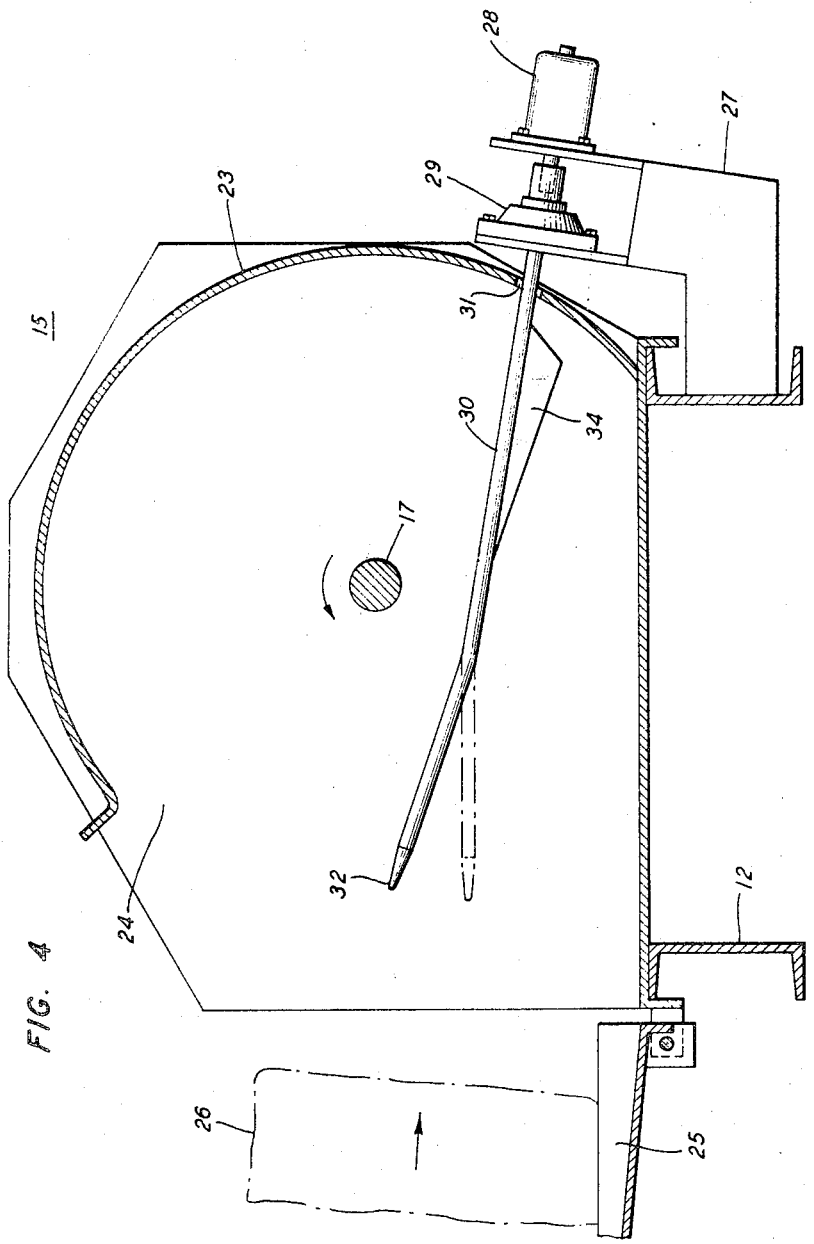
FIG. 4 is an end section view of a portion of the machine shown in FIG. 1.

FIGURE 4 shows an end section view of the chamber 15. It includes a semi-circular cylinder 23 mounted upon the frame 12 and having an opening 24. The opening 24 extends toward one side of the machine. An inclined loading tray 25 is pivotally attached to the frame 12 adjacent the opening 24. Baled mulch material 26 is shown on the tray 25. The bales of material 26 slide down the tray 25 into the opening 24.

A mounting bracket 27 is attached to the frame 12 on the opposite side of the opening 24. A motor 28 and a bearing 29 are secured to the bracket 27. A shaft or probe 30 is attached to the output of the motor 28. The shaft 30 extends from the motor 28, through the bearing 29, through an aperture 31 in the cylinder 23, through the chamber 15 and under the shaft 17 to the approximate edge of the tray 25. The shaft 30 is cantilevered or unsupported inside the chamber 15, the only support being the bearing 29 and the motor 28. A cleaning flange 34 is attached longitudinally to the shaft or probe 30. As the shaft 17 turns, there is a tendency for material to build up and catch on the underside of the probe 30. The flange 34, as the probe 30 turns, sweeps any collecting material out from under the probe 30 and keeps the machine from clogging.

The unsupported end 32 of the shaft or probe 30 is pointed. As shown in the various figures, the shaft 30 is bent, or longitudinally irregular so that when it is rotated by the motor 28, it vibrates and generates or describes a cone-shaped cylinder. The base of the cone-shaped cylinder is described by the pointed end 32 of the probe 30. The faster the motor 28 turns the probe 30, the larger the amplitude of the vibrations and the diameter of the cylinder generated by the probe 30.

In normal operation, the fan creates a suction that, together with the vibration of the operating machine, is sufficient to cause the mulch material 26 to slide down the tray 25 into the chamber 15 if it is not restrained in some way. As baled or bunched material 26 slides down the loading tray 25, it is impaled by the pointed end 32 of the probe 30. The end 32 vibrates and propels itself into the bale 26. The vibrations and irregular turning of the end 32 loosens the compacted material 26 by initially separating the material in the bales. The degree of separation is determined by the amplitude of the vibrations and the diameter of the generated cylinder which are in turn determined by the rotational speed of the shaft 30. The final breaking of the bale is accomplished by the beater or flailing chains 33 which are attached to the shaft 17. The shaft 17 generally operates at a constant speed and the chains 33 substantially determine the size of the individual fibers of mulch material by chopping and cutting the fibers as the chains rotate with the shaft 17. If the shaft 17 is rotated at a high speed, the fibers will generally be shorter then if the shaft 17 is operated at a lower r.p.m.

The mulch material 26 is restrained on the tray 25 by the point 32 and slides down the rotating probe 30 into the chamber 15. The faster the probe 30 is rotated, the more the probe 30 vibrates and the greater is the base of the cylinder. The flow rate is increased with faster rotation of the probe 30 because of larger vibrations of the pointed end 32 and its generation of a bigger cylinder. The mulch material is dispersed or broken up more. In addition, the vibration and screwing action of the probe 30 is increased causing the baled material to slide down the shaft 30 into the machine at a faster rate.

Since the probe 30 is controlled and rotated independently from the shaft 17, the rate of speed or flow rate of the mulch material 26 into the chamber 15 is controlled independently from the operation of the machine. A less dense coverage of mulch material results when the probe 30 is rotated slowly and the material flow rate into the machine is low. A dense coverage is obtained by rotating the probe 30 at a high speed, thus increasing the flow rate of material into the machine. The fiber length of the mulch can also be varied by varying the speed of rotation of the shaft 17. Thus, by independently varying the rotational speed of the probe 30 and the shaft 17, the flow rate of material into the machine and the fiber length can be individually controlled.

The bend in the shaft 30, shown in the various figures, is accentuated and exaggerated in order to more clearly show the principle of the invention. A bend or longitudinal irregularity of a fraction of an inch is sufficient to practice the invention. The bend serves the purpose of causing the shaft 30 to vibrate or generate a cone-shaped cylinder when it is rotated. The vibrating shaft 30 is preferable over a screw type rod because fibrous materials tend to wrap themselves around a screw thus causing clogging of the machine.

Various changes and modifications of the illustrative embodiment of the invention as disclosed above can be made by those skilled in the art. Such changes and modifications are intended to be and are within the scope of the specification and the appended claims.

What is claimed is:

1. The combination of disbursing means and control means, said disbursing means adapted to disburse compacted material, said control means adapted to control the rate at which said material is introduced into said disbursing means, said control means comprising rotational means, said last mentioned means describing a longitudinally irregular shape when rotated, said rotational means adapted to contact said material and introduce said material into said disbursing means at a rate proportionl to the rate at which said rotational means is rotated.

2. The combination set forth in claim 1, wherein said control means is independently controlled from said disbursing means.

3. A combination as set forth in claim 2, wherein said rotational means comprises a longitudinally irregular shaft.

4. The combination described in claim 3, wherein said disbursing means includes loading means for holding said material and said shaft includes a first end, said first end describing the base of a cone shaped cylinder when said shaft is rotated, said first end adapted to contact said material on said loading means.

5. The combination described in claim 4, wherein said material is compacted material and said shaft initially loosens said compacted material while said material is introduced into said disbursing means.

6. A combination according to claim 5, wherein said first end is pointed and said shaft is bent at least once away from its longitudinal axis, said first end being displaced from the longitudinal axis of said shaft.

7. The combination described in claim 2, wherein said disbursing means includes means for loosening said compacted material and sizing said material to a predetermined size.

8. The combination set forth in claim 7, wherein said disbursing means includes drive means and said loosening and sizing means comprises flailing means attached to said drive means.

9. The combination set forth in claim 3, wherein said control means includes means for preventing clogging of said disbursing means.

10. The combination set forth in claim 9, wherein said means for preventing clogging comprises a longitudinal extention on said shaft.

References Cited

UNITED STATES PATENTS

| | | | |
|---|---|---|---|
| 1,711,464 | 4/1929 | Ruprecht et al. | 241—186 |
| 2,681,090 | 6/1954 | Hicks et al. | 146—70.1 |
| 3,129,739 | 4/1964 | Wenger | 146—70.1 |

W. GRAYDON ABERCROMBIE, Primary Examiner

U.S. Cl. X.R.

222—228; 241—101, 186